United States Patent Office 3,635,859
Patented Jan. 18, 1972

3,635,859
IMPROVEMENTS RELATING TO ALKYD RESINS
Beppino Passalenti, Silvio Vargiu, and Ugo Nistri, Milan, Italy, assignors to Società Italiano Resine S.p.A., Milan, Italy
No Drawing. Filed Dec. 11, 1969, Ser. No. 884,335
Claims priority, application Italy, Dec. 31, 1968, 25,747/68, Patent 852,646
Int. Cl. C08g *17/013, 7/16*
U.S. Cl. 260—22 M    4 Claims

ABSTRACT OF THE DISCLOSURE

Alkyd resins are prepared by having an organic phosphite present in the monomer condensation stage and treating the condensation product with a metal salt and a peroxide.

---

The present invention relates to an improvement in the method of making alkyd resins; it is concerned more particularly with the resinous substances obtained by modification with drying oils of the substances obtained by the poly-condensation of polycarboxylic acids and polyhydroxyl alcohols.

In the preparation of alkyd resins, as is well known, polybasic acids such as, for example, isophthalic, adipic and azelaic acids, or anhydrides such as those of maleic or phthalic acid, are condensed with polyhydroxyl alcohols such as glycerine, penta-erythritol, trimethylol-propane and sorbitol.

By the addition of drying oils during poly-condensation, it is possible to obtain alkyd resins modified for use in various kinds of varnishing products.

Such resins are not altogether satisfactory for that purpose, however, especially as regards color, which present difficulties, for example, when they are used in the production of thermo-hardening white enamels. Moreover, there is often difficulty in the drying of alkyd resins, with the result that the products obtained are not fully hardened.

It has now been discovered that it is possible to obtain alkyd resins of better color and with good drying properties by the method in which this invention lies which consists substantially in the use of certain additives during the polymerization of the monomers and in the application of special treatment to the resinous substance obtained after polymerization.

In particular, one or more organic phosphites are added to the reaction mixture during polymerization of the monomers, following which the resinous product of polymerization is treated with peroxides in the presence of metal salts, in the manner to be described later.

Preferred conditions and reactants follow. The drying oil and the polyhydroxyl compounds are brought together in an initial stage of reaction, at temperatures increasing to approximately 250° C., in the presence of condensation catalysts.

Drying oils that can be used are soya oil, linseed oil, dehydrated castor oil, cottonseed oil or coconut oil, while the polyhydroxyl compounds normally consist of glycerine in combination with penta-erythritol, sorbitol or trimethylolpropane, as examples.

During this stage, catalysts, for example the hydrates, oxides or carbonates of alkali metals or alkaline earths are put into the reaction chamber in quantities such as 0.003% to 0.1% by weight referred to the oil added.

The conditions, that is to say primarily the relative amounts of the reagents, are, suitably, regulated during this first stage of reaction so as to produce substances that are soluble in ethyl alcohol.

To be more precise, the solubility characteristic is best such that 10 parts by weight of alcohol will dissolve one part by weight of the reaction product.

These conditions can be obtained, for example, by the use of molar ratios (drying oil to glycerine) of between 1:1.9 and 1:2.5.

During the second stage of reaction, the products of the first reaction are condensed with polycarboxylic acids such as, for example, isophthalic, adipic and azelaic acids, or with acid anhydrides such as, for example, phthalic and maleic anhydrides. This stage of reaction should preferably be carried out in the presence of solvents at a temperature of 175° C. to 250° C.

Moreover, one or more of the acids already mentioned are suitably used in amounts such that their content of reaction products lies between 10% and 30% by weight. The reaction times in particular preferably give a polycondensation product having the following range of characteristics:

pH value—below 15.
Gardner viscosity—Y–Z4, when determined in solutions of 70% white spirit.
KB—from 37 to 40.

During the second stage of reaction, according to the method here proposed, organic phosphites are added—to be precise, alkyl phosphites, such as, for instance trimethyl phosphite and triethyl phosphite, or aryl phosphites such as, for example, triphenyl phosphite—to the extent of from 0.05% to 0.8% by weight referred to the monomers put into reaction.

Upon completion of polymerization, the poly-condensation product is treated with metal salts and peroxide compounds at temperatures of 40° C. to 100° C. and for times of from 30 to 500 minutes.

Metal salts that are suitable are for example the naphthenates and octoates of cobalt, lead, manganese, zinc, calcium, copper, iron, cerium and zirconium. The salts are preferably used at 0.0001% to 0.15% by weight referred to the alkyd resin, the value being calculated as metal.

The peroxides are preferably methyl-ethyl ketone peroxide, methyl-isobutyl ketone peroxide, cyclohexanone peroxide, cumoyl peroxide and ter-butyl hydroperoxide. The peroxides are preferably used at 0.01% to 0.5% by weight referred to the alkyd resin.

By this simple and economically satisfactory method, it is possible to obtain alkyd resins having excellent characteristics as regards color and drying properties.

The behaviour of the resins produced in accordance with the present invention is remarkable, since it is known that organic phosphites act as inhibitors as regards drying.

EXAMPLE 1

A flask equipped with agitation, a thermometer and means for injecting an inert gas was charged with 1 mol of soya oil, 2 mols of glycerine and 0.1 g. of calcium oxide.

This was heated at 250° C. until the substance obtained was soluble in ethyl alcohol to the extent of at least one part by weight of the reaction product to 10 parts by weight of alcohol.

Then 3 mols of phthalic anhydride, 0.3 mol of glycerine and 1.5 g. of triphenyl phosphite were added.

Next, the temperature was adjusted to 240° C. and maintained at that level until the product obtained had a Gardner viscosity of $Z_2$ when determined in 70% white spirit.

Cooling to about 170° C. was then applied, followed by dilution with white spirit until there was a "dry" of approximately 70%.

Finally, after cooling to 50° C., 0.75 g. of cobalt naphthenate and 1.7 g. of methyl-ethyl ketone peroxide were added, the temperature being maintained at that level for 50 minutes.

The substance thus obtained had a color of 4 on the Gardner scale and had the following drying properties:

|  | Hours |
|---|---|
| Outside powder | 1 |
| Dry to the touch | 2 |
| Complete | 16 |

EXAMPLE 2 (COMPARATIVE)

The same procedure was followed as in Example 1, but without the addition of triphenyl phosphite.

The resultant substance had a color of 7 on the Gardner scale.

EXAMPLE 3 (COMPARATIVE)

The same procedure was followed as in Example 1, but without the treatment with cobalt naphthenate and methyl-ethyl ketone peroxide.

The resultant product had the following drying properties:

| Outside powder | 4 hours. |
|---|---|
| Dry to the touch | 5 hours. |
| Complete | More than 24 hours. |

We claim:
1. In a method of preparing alkyd resins comprising
   (1) condensing a reaction mixture of polyhydroxyl compounds having at least three hydroxyl groups and natural drying oils in the presence of a condensation catalyst to form a condensation product, and
   (2) condensing in the presence of an inert solvent said condensation product of step (1) with polycarboxylic compounds selected from the group consisting of polycarboxylic acids and polycarboxylic acid anhydrides to form an alkyd resin,
   the improvement which comprises the condensation of step (2) being in the presence of organic phosphites selected from the group consisting of alkyl phosphites and aryl phosphites at a level of from 0.05 to 0.8% by weight based on the weight of the polyhydroxyl compounds, the drying oils and the polycarboxylic compounds,
   the improvement being further characterized as treating at a temperature of from 40° C. to 100° C. for from 30 to 500 minutes the alkyd resins prepared in step (2) with from 0.0001% to 0.15% by weight, calculated as the metal, of a metal salt of an organic acid and with from 0.01% to 0.5% by weight of an organic peroxide compound, said weights being based on the alkyd resin.

2. A method as in claim 1, in which the phosphite is selected from trimethyl phosphite, triethyl phosphite and triphenyl phosphite.

3. A method as in claim 1, in which the metal salt is selected from naphthenates and octoates of calcium, lead, manganese, zinc, cobalt, copper, iron, cerium and zirconium.

4. A method as in claim 1, in which the peroxide is selected from methyl-ethyl ketone peroxide, methyl-isobutyl ketone peroxide, cyclohexanone peroxide, cumoyl peroxide and ter-butyl hydroperoxide.

References Cited

UNITED STATES PATENTS

| 2,921,051 | 1/1960 | Amborski et al. | 260—75 |
| 3,134,744 | 5/1964 | Starck et al. | 260—22 |
| 3,179,530 | 4/1965 | Erikson et al. | 260—22 |
| 3,404,121 | 10/1968 | Barkey | 260—45.7 |

FOREIGN PATENTS

| 588,833 | 6/1947 | Great Britain | 260—22 |
| 697,320 | 9/1953 | Great Britain | 260—22 |

DONALD E. CZAJA, Primary Examiner

R. W. GRIFFIN, Assistant Examiner

U.S. Cl. X.R.

117—161 K; 260—22 CA, 75 M